United States Patent
Xu (10) Patent No.: US 10,291,995 B2
(45) Date of Patent: May 14, 2019

(54) AUDIO PLAY CONTROL METHODS AND APPARATUSES, AND ELECTRONIC DEVICES

(71) Applicant: BEIJING ZHIGU RUI TUO TECH CO., LTD., Beijing (CN)

(72) Inventor: Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/556,259

(22) PCT Filed: Mar. 4, 2016

(86) PCT No.: PCT/CN2016/075561
§ 371 (c)(1),
(2) Date: Sep. 6, 2017

(87) PCT Pub. No.: WO2016/145996
PCT Pub. Date: Sep. 22, 2016

(65) Prior Publication Data
US 2018/0246693 A1     Aug. 30, 2018

(30) Foreign Application Priority Data
Mar. 13, 2015   (CN) .......................... 2015 1 0110110

(51) Int. Cl.
G06F 3/16     (2006.01)
H04M 1/725    (2006.01)
H04R 29/00    (2006.01)

(52) U.S. Cl.
CPC ........... H04R 29/001 (2013.01); G06F 3/165 (2013.01); H04M 1/7253 (2013.01);
(Continued)

(58) Field of Classification Search
CPC ............... H04M 1/0245; H04R 29/001; H04R 2499/11; G06F 3/165
See application file for complete search history.

(56) References Cited

U.S. PATENT DOCUMENTS 9,693,138 B2 *   6/2017   Fraisse .................... H03F 3/181
2008/0188273 A1  8/2008   You
(Continued)

FOREIGN PATENT DOCUMENTS

CN       102082844 A      6/2011
CN       102438188 A      5/2012
(Continued)

OTHER PUBLICATIONS

International Search Report and Written Opinion for Application No. PCT/CN2016/075561, dated May 24, 2016, 7 pages.

*Primary Examiner* — Jesse A Elbin
(74) *Attorney, Agent, or Firm* — Sheppard Mullin Richter & Hampton LLP (57) ABSTRACT

This application discloses various audio play control methods and apparatuses, and various electronic devices. One of the audio play control method comprises: determining play control information of a first audio that is being played or to be played by an electronic device, in response to that an acoustic part of the electronic device is blocked; and sending the play control information to play, according to the play control information, a corresponding audio through an acoustic part of at least another electronic device. This application can compensate for or replace an audio play sound effect of the electronic device through the at least another electronic device, thereby improving convenience when a user uses.

26 Claims, 3 Drawing Sheets

(52) U.S. Cl.
CPC .... *H04M 1/72558* (2013.01); *H04M 2250/12* (2013.01); *H04R 2499/11* (2013.01)

(56) References Cited

U.S. PATENT DOCUMENTS

| | | |
|---|---|---|
| 2012/0063607 A1 | 3/2012 | Tong et al. |
| 2013/0251164 A1* | 9/2013 | Gautama .............. H04R 29/001 381/59 |
| 2016/0139702 A1* | 5/2016 | Franklin ................. G06F 3/044 345/174 |
| 2016/0373872 A1 | 12/2016 | Chen et al. |

FOREIGN PATENT DOCUMENTS

| | | |
|---|---|---|
| CN | 103501375 A | 1/2014 |
| CN | 203496791 U | 3/2014 |
| CN | 203813943 U | 9/2014 |

\* cited by examiner

AUDIO PLAY CONTROL METHODS AND APPARATUSES, AND ELECTRONIC DEVICES

CROSS-REFERENCE TO RELATED APPLICATIONS

This application is a National Phase Application of International Application No. PCT/CN2016/075561, filed on Mar. 4, 2016, which claims the priority to and benefit of Chinese Patent Application No. 201510110110.8, filed on Mar. 13, 2015, and entitled "Audio Play Control Methods and Apparatuses, and Electronic Devices". Both of the above-referenced applications are incorporated into the present application by reference in their entirety.

TECHNICAL FIELD

This application relates to the field of communications technologies, and in particular, to various audio play control methods and apparatuses, and various electronic devices.

BACKGROUND

At present, electronic devices such as a mobile phone and a tablet are usually configured with a speaker. A user can play multimedia content through the speaker to improve user experience of multimedia content consumption for the user.

However, during actual applications, an acoustic part of the electronic device may be blocked, so that there is a relatively big difference between a sound effect the user hears and a desired sound effect of audio play, or the user may not hear the sound. Therefore, it is inconvenient for the user.

SUMMARY

The following specification gives a brief description of this application, for the convenience of providing a basic understanding of some aspects of this application. It should be understood that the summary is not an exhaustive summary about this application. It is not intended to determine the key or important part of this application, or to define the scope of this application. The purpose is only to give some concepts in a simplified form, as a preface of the subsequent detailed descriptions.

Embodiments of this application provide various audio play control methods and apparatuses, and various electronic devices.

In a first aspect, an embodiment of this application provides an audio play control method, comprising:

determining play control information of a first audio that is being played or to be played by an electronic device, in response to that an acoustic part of the electronic device is blocked; and sending the play control information to play, according to the play control information, a corresponding audio through an acoustic part of at least another electronic device.

In a second aspect, an embodiment of this application provides an audio play control apparatus, comprising:

a play control information determining module, configured to determine play control information of a first audio that is being played or to be played by an electronic device, in response to that an acoustic part of the electronic device is blocked; and a play control information sending module, configured to send the play control information to play, according to the play control information, a corresponding audio through an acoustic part of at least another electronic device.

In a third aspect, an embodiment of this application further provides an electronic device, wherein the electronic device comprises any one of the audio play control apparatuses provided by the embodiments of this application.

The embodiments of this application can determine play control information of a first audio that is being played or to be played by an electronic device, in response to that an acoustic part of the electronic device is blocked; can send the play control information to outside of the electronic device after determining the play control information of the first audio, to cause that at least another electronic device receives the play control information; can play, according to the play control information, a corresponding audio, through an acoustic part of the at least another electronic device; and therefore, compensate for or replace damage of the first audio play sound effect that is caused by that the acoustic part of the electronic device is blocked, thereby achieving that in a situation that the acoustic part of the electronic device is blocked. Application requirements such as appreciation to an audio that is being played or to be played by the electronic device can also be met for the user, which is convenient for the user to use, and improves user experience.

These and other advantages of the invention will be more apparent through the following detailed description of the optional embodiment of this application with reference to the accompanying drawings.

BRIEF DESCRIPTION OF THE DRAWINGS

This application can be better understood with reference to descriptions given by accompanying drawings in the following specification. Same or similar numerals are used to represent same or similar components in all accompanying drawings. The accompany drawings together with the detailed description below are included in the specification and form parts of the specification for further illustrating optional embodiments of this application and explaining principles and advantages of this application by way of example. In the accompanying drawings.

A person skill in the art should understand that, elements in the accompanying drawings are shown merely for the sake of simplicity and clarity, and are not necessarily to scale. For example, sizes of some elements in the accompanying drawings may be amplified relative to other elements, so as to improve understanding of embodiments of this application.

DETAILED DESCRIPTION

The following specification describes exemplary embodiments of this application in detail with reference to the accompanying drawings. Not all features of an actual implementation are described in the specification for clarity and conciseness. However, it should be understood that during developing any practical embodiment many decisions specific to the practical embodiment must be made, to realize the particular target of the developer, for example, to conform those limitation conditions related to the system and the business, and those limitation conditions may vary with different implementations. Moreover, it should be appreciated that such a development effort might be complex and time consuming, but would nevertheless be a routine undertaking of the development effort for a person skilled in the art having the benefit of this disclosure.

It should be further noted that merely an apparatus structure and/or a processing step closely related to a solution of this application are described in the accompanying drawings and the specification to avoid obscuring the invention with unnecessary detail, and a representation and a description that are not especially pertinent to this application and are known to a person of ordinary skill in the art.

Specific implementations of the present application are further described in detail below with reference to the accompanying drawings (in which like elements are denoted by like reference numerals) and embodiments. The following embodiments are intended to describe the present application, but not to limit the scope of this application.

Figure 1:
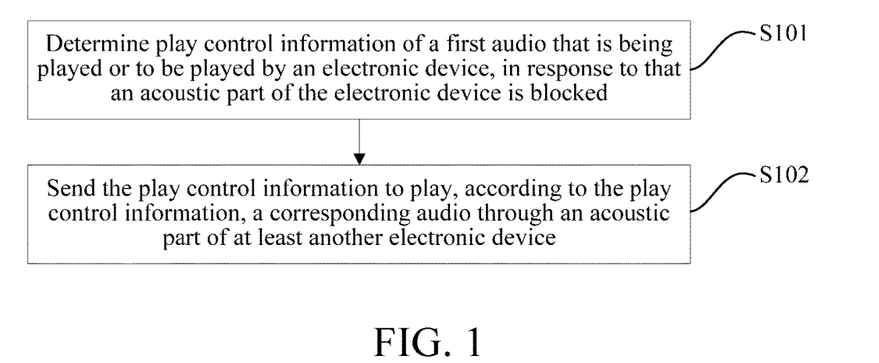
FIG. 1 is a flowchart of an audio play control method provided by an embodiment of this application.

A person skilled in the art may understand that terms such as "first" or "second" are merely used to distinguish different steps, devices, or modules. These terms do not represent any particular technical meaning, or do not represent necessary logical sequence among them. FIG. 1 is a flowchart of an audio play control method provided by an embodiment of this application. An audio play control method provided by this application can be executed by an audio play control apparatus. A presentation form of a device of the audio play control apparatus is not limited. For example, the audio play control apparatus can be an independent part; or the audio play control apparatus can be a functional module integrated within an electronic device, which is not limited by the embodiments of this application. Specifically, as shown in FIG. 1, an audio play control method provided by an embodiment of this application provided comprises:

S101: Determining play control information of a first audio that is being played or to be played by an electronic device, in response to that an acoustic part of the electronic device is blocked.

The acoustic part is a part configured to make a sound or externally output a sound signal for the electronic device. For example, the acoustic part of the electronic device can comprise but is not limited to: acoustic parts such as a speaker of the electronic device, and/or a hole, a film, and a net of the sound signal of a sound given out by an acoustic part that is disposed on a housing of the electronic device for the convenience of making a sound. If the acoustic part of the electronic device is blocked, a sound effect heard by a user through the acoustic part is affected. For example, volume is decreased, and/or for an application scenario of a directional audio play, an actual transmission direction of a sound wave is changed, and is inconsistent with a desired direction, and so on.

That an acoustic part of the electronic device is blocked comprises: at least a part of at least one acoustic device of the electronic device is blocked. The blocking has some influence on a sound effect that is heard or might be heard by a user. In technical solutions provided by the embodiments of this application, the audio play control apparatus may determine play control information of an audio (might be called "a first audio") that is being played or to be played by the electronic device in response to a situation that the acoustic part of the electronic device is blocked.

S102: Send the play control information to play, according to the play control information, a corresponding audio through an acoustic part of at least another electronic device.

After determining the play control information of the first audio, the play control information is sent to outside of the electronic device, to cause that at least another electronic device receiving the play control information can play a corresponding audio through the acoustic part of the at least another electronic device according to the play control information. Therefore, damage of the first audio play sound effect that is caused by that the acoustic part of the electronic device is blocked is compensated for or replaced, thereby achieving that in a situation that the acoustic part of the electronic device is blocked. Application requirements such as appreciation to an audio that is being played or to be played by the electronic device can also be met for the user, which is convenient for the user to use, and improves user experience.

In actual applications, during a process that the acoustic part of the at least another electronic device plays the corresponding audio, the acoustic part of the electronic device can determine whether to display the first audio according to actual needs. The embodiments of this application do not limited herein. For example, the blocked acoustic part of the electronic device may not play or may stop playing the first audio. Or all acoustic parts of the electronic device may not play or may stop playing the first audio. Or at least a part of the acoustic part of the electronic device still plays the first audio.

In the technical solutions provided by the embodiments of this application, the play control information can comprise but is not limited a kind of or multiple kinds of information used to represent attribute, acquiring manner, progress, volume, and a control parameter of an audio that is being played or to be played by the electronic device.

Optionally, the play control information comprises at least on the following: attribute information of the first audio, content of the first audio, and content acquiring manner information of the first audio.

For example, the play control information can comprise at least the content of the first audio. The solution sends content of the first audio to the at least another electronic device though an audio control apparatus, thereby improving convenience of acquiring corresponding audio content by the at least another electronic device, which is beneficial to synchronously playing the corresponding audio by the electronic device and the at least another electronic device.

For another example, the play control information can comprise at least the attribute information of the first audio. The attribute information of the first audio can comprise but is not limited to information such as a name of an audio, a document format, and play time, to cause that at least another electronic device can determine audio content that matches the attribute information of the first audio, and is played through the acoustic part of the at least another electronic device. In this solution, the at least another electronic device can determine, according to the attribute information of the first audio, a corresponding audio to be played, to cause that even if the audio play control apparatus does not send the content of the first audio to the at least another electronic device, the at least another electronic device can acquire the content of the corresponding audio in other manners. For example, the content of the corresponding audio is determined in a local hard disk of the at least another electronic device. Or, the content of the corresponding audio is determined in manners of a cloud disk and a communications network, thereby reducing an interactive frequency and an interactive data quantity between the audio play control apparatus and the at least another electronic device.

For yet another example, the control information can comprise at least the content acquiring manner information of the first audio. The content acquiring manner information of the first audio can comprise but is not limited to path information that can acquire the first audio. The path information can be but is not limited to a cloud disk path, a server path, and a network link. In this solution, the at least another electronic device can acquire, according to the content acquiring manner information, content of a corresponding audio, to cause that even if the audio play control apparatus does not send the content of the first audio to the at least another electronic device, the at least another electronic device can acquire the content of the corresponding audio in other manners. For example, the content of the corresponding audio is determined in a local hard disk of the at least another electronic device. Or, the content of the corresponding audio is determined in manners of a cloud disk and a communications network, thereby reducing an interactive time and an interactive data quantity between the audio play control apparatus and the at least another electronic device.

Optionally, the play control information comprises: play parameter information of the first audio. The play parameter information comprises but is not limited one kind of or multiple kinds of information used to represent a play condition of the first audio. The at least another electronic device can pointedly compensate for or replace a sound effect of the first audio that is played by the electronic device according to the play parameter information. For example, the play parameter information can comprise at least one of the following: the play progress information and the play volume information. The at least another electronic device can adjust a beginning position of playing the corresponding audio according to the play progress information, to cause that the user can continue appreciating the corresponding audio. The at least another electronic device can adjust volume of playing the corresponding audio according to the play volume information, to compensate for a volume loss of the first audio that is played by the electronic device, or to replace the electronic device and play the corresponding audio by using the same volume, to cause that even if in a situation that the acoustic part of the electronic device is blocked, the user can acquire user experience that is uninterrupted or little interrupted, and more close to a desired sound effect.

Optionally, the play control information comprises: amplitude and phase information of a desired sound signal of the first audio, and amplitude and phase information of the first audio that is being played or to be played by an unblocked acoustic part of the electronic device. If the electronic device is configured with multiple speakers, directional transmission of a sound wave beam can be achieved through multiple speakers, to achieve one or more effects of audio directional transmission and power saving. For this purpose, if the electronic device is configured with multiple speakers, and only a part of the multiple speakers are blocked, the acoustic part of the at least another electronic device can be used to compensate for or replace the sound effect of the blocked acoustic parts of the electronic device. Therefore, in a situation that the acoustic part of the electronic device is blocked, an effect similar to the audio directional play can be achieved. For example, if the electronic device is configured with a first speaker and a second speaker, amplitude of a sound signal given out by the first speaker is A1, and a phase is a1. Amplitude of a sound signal given out by the second speaker is A2, and a phase is a2. Information such as the amplitude and phase of the sound signal given out by two speakers is superimposed in space, to obtain desired amplitude A3 and phase a3 of a sound signal. If a sound effect is damaged because there is a block on a transmission channel of the sound signal given out by the first speaker, the electronic device can send information such as the desired amplitude A3 and phase a3 of the sound signal and the amplitude A2 and phase a2 of the sound signal that corresponds to the second speaker to the at least another electronic device. The at least another electronic device can determine amplitude A1' and phase a1' of a sound signal of a corresponding audio that needs to be played through an own acoustic device according to information such as the desired amplitude A3 and phase a3 of the sound signal and the amplitude A2 and phase a2 of the sound signal that corresponds to the second speaker, to cause that a superimposed effect of the sound signal in the space as close to the directional play sound effect that is desired to be achieved as possible.

It can be understood that the play control information can further comprise two or more than two kinds of parameters that are listed above and are not exhaustive for audio play control. The specific can be determined according to actual needs. This application does not limited herein.

After finishing determining the play control information, the audio play control apparatus can send the play control information. A sending manner of the play control information can be determined according to actual needs. For example, the audio play control apparatus can send the play control information in a manner of broadcast. This solution is beneficial to finding as more as possible other electronic devices that can receive the play control information within a broadcasting range. For another example, the audio play control apparatus can send the play control information in a manner of unicast, for example, sending the play control information to the at least another electronic device. Optionally, the at least another electronic device can be determined in other electronic devices that have been set in pair with or might match the electronic device, thereby improving a pertinence of choosing a device that can provide sound effect compensation or replacement matching.

Optionally, after sending the play control information, the audio play control method further comprises: sending stop play information in response to that the acoustic part of the electronic device is removed from a blocked status, to instruct the at least another electronic device to stop playing a corresponding audio. If the acoustic part of the electronic device that is originally blocked is removed from a blocked status, the stop play information is sent to outside of the electronic device. The stop play information can be sent in a manner of broadcast or unicast, to cause that the at least another electronic device that plays the corresponding audio to stop playing, according to the received stop play information, the corresponding audio. This solution can inform in time the at least another electronic device to stop playing the corresponding audio when the acoustic part of the electronic device changes into an unblocked status from the blocked status, and the corresponding audio is played through the acoustic part of the electronic device, which corresponding to being switched into an own acoustic part of the electronic device, thereby improving convenience when the user uses.

In the technical solutions provided by the embodiments of this application, there are wide types of the electronic device and the other electronic devices. The embodiments of this application do not limit herein. For example, the electronic device comprises a hand-held electronic device. The hand-held electronic device can comprise but is not limited to hand-held devices with an audio play function such as a mobile phone and a tablet. And/or the at least another electronic device comprises at least one wearable device. The wearable device can comprise but is not limited to wearable devices with an audio play function, such as a smart bracelet and a smart watch. With popularity of the hand-held electronic device and/or the wearable device, there is more application that the user uses the foregoing electronic device to play an audio. A rate that the acoustic part of the electronic device is blocked is relatively high. A sound effect that is damaged because the acoustic part is blocked can be effectively compensated for or replaced by using the technical solutions provided by the embodiments of this application, which is beneficial to improving user experience.

Figure 2:
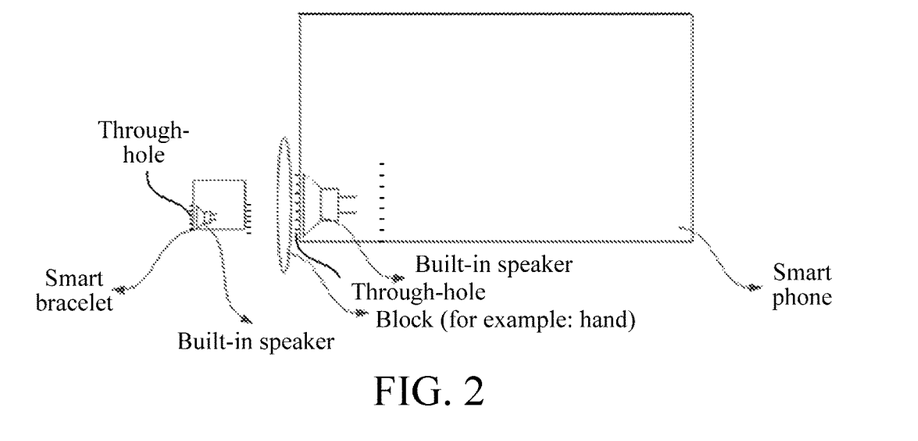
FIG. 2 is an example of an optional application scenario provided by an embodiment of this application.

For example, a speaker is usually disposed within a smart phone. Parts such as a hole and a network mask can be formed on a housing of the smart phone. The parts such as the hole and the network mask are an optional manner of the acoustic part of the embodiments of this application. During a process that the user holds a mobile phone, the foregoing acoustic part might be blocked, to cause that an audio play sound effect to the outside is influenced thereto. An optional application scenario is shown in FIG. 2. Multiple through-holes are formed on a bottom of a smart phone housing. A sound signal of a built-in speaker can be sent out though the through-holes. When a user holds the smart phone in a landscape position when playing games or watching a video, the way that the user hold the smart phone blocks the multiple through-holes are formed on the bottom of the smart phone housing, thereby blocking a sound signal played by the speaker to be transmitted outside. Thus, a phenomenon that volume is obviously reduced is caused, which influences a sound effect quality that the user can hear. Assuming that the user is wearing a smart bracelet having an audio play function, at this time, using any one of the audio control methods provided by the embodiments of this application can send the play control information of an audio that is being played on the smart phone to the smart bracelet, so that a corresponding audio can be played through an acoustic part on the smart bracelet, to cause that even if a holding manner of the user blocks the an acoustic part on the smart phone, the user can play the audio through a speaker by using the smart bracelet, and does not need to change the original holding manner, thereby improving convenience when the user uses, and being beneficial to improving user experience.

Optionally, before play control information of the first audio that is being played or to be played by the electronic device is determined, it needs to be determined that hand-held electronic device is in a landscape mode. Because of factors such as a using habit of a user, an application display feature, and a set position of an acoustic part, practice shows that a rate that the acoustic part is blocked is relatively high when the electronic device is used in a landscape mode. This solution considers the hand-held electronic device in the landscape mode as a trigger condition of whether to use other electronic devices to compensate for or replace a sound effect, to cause that the audio play control is more pertinent.

Optionally, in an implementation of any one of the audio play control methods provided by the embodiments of this application, an acquiring manner of information that whether the acoustic part of the electronic device is blocked is very flexible. For example, the information can be provided by an external device of the electronic device. For example, the external device informs that the acoustic part of the electronic device is blocked in a manner of communication. For another example, information that whether the acoustic part of the electronic device is blocked can be determined through an audio play control apparatus or an electronic device comprising the audio play control apparatus. That is, the audio play control method can further comprise: determining that the acoustic part of the electronic device is blocked. This solution is beneficial to improving timeliness of compensation or replacement processing.

A determining manner of whether the acoustic part of the electronic device is blocked is very flexible. The embodiments of this application do not limit herein.

For example, the determining that the acoustic part of the electronic device is blocked comprises: determining temperature sensing detecting information of an area where the acoustic part of the electronic device is located; and determining that the acoustic part of the electronic device is blocked at least according to the temperature sensing detecting information. When a body part such as a finger or a palm of a user blocks the acoustic part of the electronic device, temperature of an area where a blocked part is located is different from temperature of an area where an unblocked part is located. For example, the area where the blocked part is located is relatively close to a body part such as a finger or a palm, and therefore the temperature is relatively high. Therefore, that whether the acoustic part of the electronic device is blocked can be determined by using but not limited to manners such as detecting temperature by a temperature sensor, which takes advantage of a property of temperature difference. This solution is easy to be implemented, and accuracy is relatively high.

For another example, the determining that the acoustic part of the electronic device is blocked can further comprise: analyzing an image of the electronic device; and determining that the acoustic part of the electronic device is blocked at least according to an analysis result of the image. An area where the electronic device is configured with the acoustic part in the image can be analyzed. whether there is a block is determined according to the analysis result, to determine whether the acoustic part of the electronic device is blocked. This solution is easy to be implemented, and accuracy is relatively high.

In addition, whether the acoustic part of the electronic device is blocked can be determined by using but not limited to one or more of the following methods: determining whether the acoustic part of the electronic device is blocked at least according to acoustic impedance of the acoustic part; determining whether the acoustic part of the electronic device is blocked at least according to amplitude loss information of a sound signal that is transmitted; and the like. The embodiments of this application do not limit specific determining methods.

During actual applications, two or more than two methods used to determine whether the acoustic part of the electronic device is blocked can be combined together to improve accuracy of a determining result.

A person skilled in the art can understand that in any one of the foregoing methods of specific implementations of this application, values of serial numbers of steps do not mean an execution sequence. The execution sequence of the steps should be determined according to functions and internal logic, and should not limit an implementation process of the specific implementations of this application.

Figure 3:
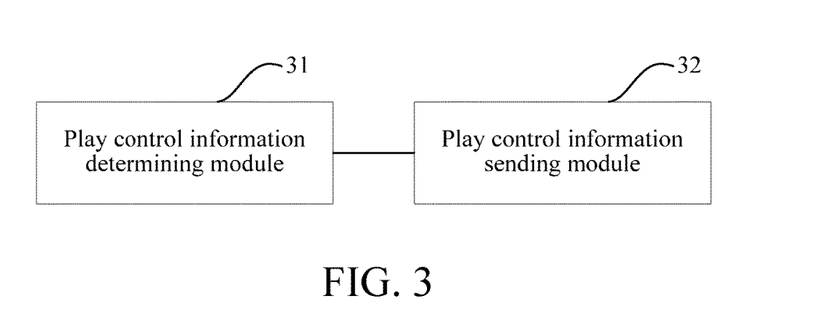
FIG. 3 is a logic block diagram of a first audio play control apparatus provided by an embodiment of this application.

FIG. 3 is a logic block diagram of a first audio play control apparatus provided by an embodiment of this application. As shown in FIG. 3, an audio play control apparatus provided by an embodiment of this application can comprise: a play control information determining module 31 and a play control information sending module 32.

The play control information determining module 32 is configured to determine play control information of a first audio that is being played or to be played by an electronic device, in response to that an acoustic part of the electronic device is blocked.

The play control information sending module 32 is configured to send the play control information to play, according to the play control information, a corresponding audio through an acoustic part of at least another electronic device.

The audio play control apparatus provided by the embodiments of this application can determine play control information of a first audio that is being played or to be played by an electronic device, in response to that an acoustic part of the electronic device is blocked; can send the play control information to outside of the electronic device after determining the play control information of the first audio, to cause that at least another electronic device receives the play control information; can play, according to the play control information, a corresponding audio, through an acoustic part of the at least another electronic device; and therefore, compensate for or replace damage of the first audio play sound effect that is caused by that the acoustic part of the electronic device is blocked, thereby achieving that in a situation that the acoustic part of the electronic device is blocked, application requirements such as appreciation to an audio that is being played or to be played by the electronic device can also be met for the user, which is convenient for the user to use, and improves user experience.

A presentation form of a device of the audio play control apparatus is not limited. For example, the audio play control apparatus can be an independent part; or the audio play control apparatus can be a functional module integrated within an electronic device, which is not limited by the embodiments of this application.

Optionally, the play control information comprises at least one of the following: attribute information of the first audio, content of the first audio, and content acquiring manner information of the first audio; and/or, the play control information comprises: play parameter information of the first audio. The play parameter information comprises at least one of the following: the play progress information and the play volume information; and/or, the play control information comprises: amplitude and phase information of a desired sound signal of the first audio and amplitude and phase information of a sound signal of the first audio that is being played or to be played by an unblocked acoustic part of the electronic device. This solution is beneficial to achieving one kind or more kinds of technical effects such as reducing an interactive frequency, an interactive data quantity, audio simultaneous play, and audio directional play between electronic devices, through a content setting of the play control information.

Figure 4:
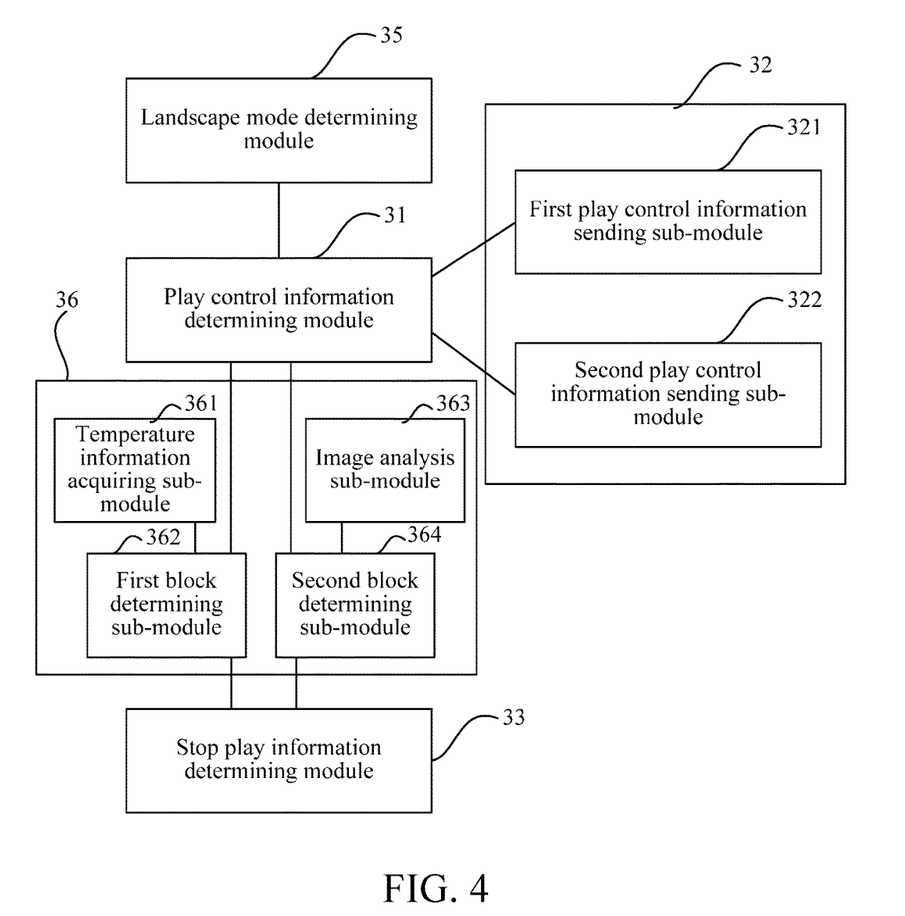
FIG. 4 is a logic block diagram of a second audio play control apparatus provided by an embodiment of this application.

Optionally, as shown in FIG. 4, the play control information sending module 32 comprises: a first play control information sending sub-module 321. The first play control information sending sub-module 321 is configured to send the play control information in a manner of broadcast. This solution is beneficial to that more other electronic devices can receive the play control information within a broadcasting range.

Optionally, the play control information sending module 32 comprises: a second play control information sending sub-module 322. The second play control information sending sub-module 322 is configured to send the play control information to the at least another electronic device. This solution is beneficial to improving a pertinence of choosing a device that can provide sound effect compensation or replacement matching.

Optionally, the audio play control apparatus can further comprise: a stop play information determining module 33. The stop play information determining module 33 is configured to send stop play information in response to that the acoustic part of the electronic device is removed from a blocked status, to instruct the at least another electronic device to stop playing a corresponding audio. This solution can inform in time the at least another electronic device to stop playing the corresponding audio when the acoustic part of the electronic device changes into an unblocked status from the blocked status, and the corresponding audio is played through the acoustic part of the electronic device, which corresponding to being switched into an own acoustic part of the electronic device, thereby improving convenience when the user uses.

Optionally, the electronic device comprises a hand-held electronic device, and/or the least another electronic device comprises at least one wearable device. A rate that the acoustic part of the foregoing electronic device is blocked is relative high. A sound effect that is damaged because the acoustic part is blocked can be effectively compensated for or replaced by using the technical solutions provided by the embodiments of this application, thereby improving convenience when the user uses, which is beneficial to improving user experience.

Optionally, the audio play control apparatus further comprises: a landscape mode determining module 35. The landscape mode determining module 35 is configured to determine that the hand-held electronic device is in a landscape mode, and enable the play control information determining module according to a determining result. Practice shows that a rate that the acoustic part is blocked is relatively high when the electronic device is used in a landscape mode. This solution considers the hand-held electronic device in the landscape mode as a trigger condition of whether to use other electronic devices to compensate for or replace a sound effect, to cause that the audio play control is more pertinent.

Optionally, the audio play control apparatus further comprises: block determining module 36. The block determining module 36 is configured to determine that the acoustic part of the electronic device is blocked. This solution is beneficial to improving timeliness of compensation or replacement processing.

Optionally, the block determining module 36 comprises: a temperature information acquiring sub-module 361 and a first block determining sub-module 362. The temperature information acquiring sub-module 361 is configured to determine temperature sensing detecting information of an area where the acoustic part of the electronic device is located; and the first block determining sub-module 362 is configured to determine, according to the temperature sensing detecting information, that the acoustic part of the electronic device is blocked. This solution is easy to be implemented, and accuracy is relatively high.

Optionally, the block determining module 36 comprises: an image analysis sub-module 363 and a second block determining sub-module 364. The image analysis sub-module 363 is configured to analyze an image of the electronic device; and the second block determining sub-module 364 is configured to determine, at least according to an analysis result of the image, that the acoustic part of the electronic device is blocked. This solution is easy to be implemented, and accuracy is relatively high.

Figure 5:
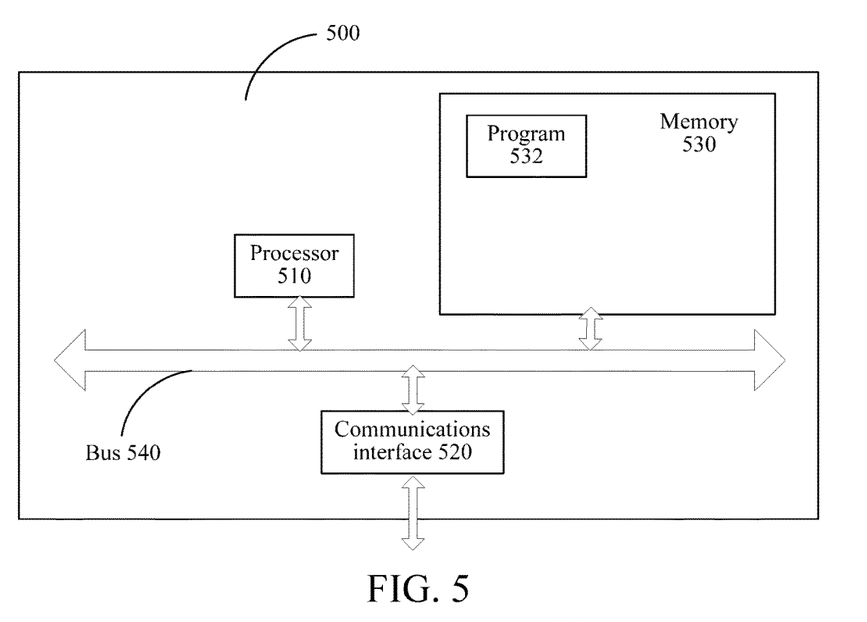
FIG. 5 is a logic block diagram of a third audio play control apparatus provided by an embodiment of this application.

FIG. 5 is a logic block diagram of a third audio play control apparatus provided by an embodiment of this application. Embodiments of this application do not limit specific implementations of an audio play control apparatus 500. As shown in FIG. 5, the audio play control apparatus 500 may be a computer system, which can comprise:

a processor 510, a communications interface 520, a memory 530, and a communications bus 540. where:

the processor 510, the communications interface 520, and the memory 530 accomplish communication among each other through the communications bus 540.

The communications interface 520 is configured to communicate with electronic devices such as a smart phone and a smart bracelet.

The processor 510 is configured to execute a program 532, and specifically may execute related steps in the embodiments of any one of the foregoing audio play control methods.

For example, the program 532 can comprise program code. The program code comprises a computer operation instruction.

The processor 510 may include a central processing unit (CPU for short), an application specific integrated circuit (ASIC for short), or one or more integrated circuits configured to be the embodiments of this application.

The memory 530 is configured to store the program 532. The memory 530 may comprise a random access memory (RAM for short), and may further comprise a non-volatile memory, for example, at least one magnetic disk storage.

For example, in an optional implementation, the processor 510 can perform the following steps by executing the program 532: determine play control information of a first audio that is being played or to be played by an electronic device, in response to that an acoustic part of the electronic device is blocked; and send the play control information to play, according to the play control information, a corresponding audio through an acoustic part of at least another electronic device. In other optional implementations, the processor 510 can further perform steps mentioned by any one of the foregoing embodiments through executing the program 532, which is not described herein.

For specific implementation of steps in the program 532, reference may be made to a description that corresponds to a corresponding step, module, sub-module, and unit in the foregoing embodiments, which is not described herein. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 6:
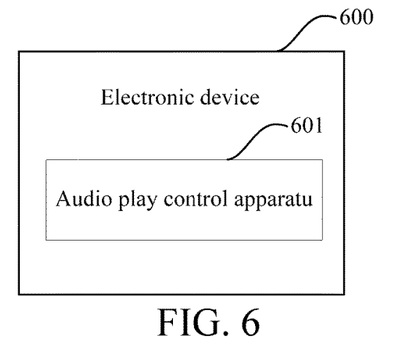
FIG. 6 is a logic block diagram of an electronic device provided by an embodiment of this application.

In addition, an embodiment of this application further provides an electronic device. As shown is FIG. 6, an electronic device 600 comprises any audio play control apparatus 601 provided by the embodiment of this application. The electronic device has an audio play function, and is configured with one or more acoustic parts. There are various types of devices, comprising but not limited to a hand-held device, a wearable device, and a portable terminal. The hand-held device can comprise but is not limited to a smart phone and a tablet. The portable terminal can comprise but is not limited to a smart bracelet, a pair of smart glasses, and a smart watch. For aspects such as an optional structure, a working mechanism, and an optional application scenario, reference can be made to other parts descriptions of this application, which is not described herein again.

In the foregoing embodiments of this application, serial numbers and/or sequences of the embodiments are merely used for convenience of description, and do not represent quality of the embodiments. Different emphasis is put on a description of each embodiment. For a part that is not described in detail in an embodiment, reference can be made to related descriptions of other embodiments. For related descriptions of implementation principle or process of a related apparatus, device, or system, reference can be made to records of corresponding embodiments, which is not described herein again.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on such understanding, the technical solutions of the present invention in the essence substantively, or a part thereof making a contribution to the prior art, may be reflected in a form of a computer software product. The computer software product is stored in a storage medium, comprising multiple instructions used to enable a computer device (may be a personal computer, a server, or a network device, and the like) to execute all or a part steps of the method that is described in the embodiments of this application. The foregoing computer-readable storage medium comprises a U disk, a mobile hard disk, a read-only memory (ROM for short), a random access memory (RAM for short), a magnetic disk, or an optical disc, or any other medium that can be used for storing program code.

In the apparatus, method, and system of embodiments of this application, obviously, each part (a system, a sub system, a module, a sub-module, a unit, a sub unit, and the like) or each step can be disassembled, combined and/or recombined after being disassembled. The disassembling and/or recombination should be viewed as an equivalent solution of this application. In addition, in the foregoing descriptions of specific embodiments of this application, a feature that is aimed at a description of an embodiment and/or is shown can be used in one or more other implementations in a same or similar manner, is combined with features in other implementations, or replace features in other implementations. It should be emphasized that a term "comprise/contain" used in the specification refers to presence of a feature, an element, or component, but the use of the term does not preclude the presence or addition of one or more other features, elements, steps, or components.

Finally, it should be noted that the foregoing implementations are only used to describe the present application, but not to limit the present application. A person of ordinary skill in the art can still make various alterations and modifications without departing from the spirit and scope of the present application; therefore, all equivalent technical solutions also fall within the scope of the present application, and the patent protection scope of the present application should be subject to the claims.

What is claimed is:

1. An audio play control method, comprising:
   determining play control information of a first audio that is being played or to be played by an electronic device, in response to determining that an acoustic part of the electronic device is blocked at least according to one or more of:
   temperature information of an area of the acoustic part of the electronic device,
   image information of the electronic device,
   acoustic impedance of the acoustic part of the electronic device, and
   amplitude loss information of a sound signal that is transmitted; and
   sending the play control information to play, according to the play control information, a corresponding audio through an acoustic part of at least another electronic device,
   wherein the sending the play control information comprises: sending the play control information by broadcasting.

2. The method of claim 1, wherein the play control information comprises at least one of the following: attribute information of the first audio, content of the first audio, and content acquiring manner information of the first audio.

3. The method of claim 1, wherein the play control information comprises: play parameter information of the first audio.

4. The method of claim 3, wherein the play parameter information comprises at least one of the following: play progress information and play volume information.

5. The method of claim 1, wherein the play control information comprises: amplitude and phase information of a desired sound signal of the first audio, and amplitude and phase information of the first audio that is being played or to be played by an unblocked acoustic part of the electronic device.

6. The method of claim 1, wherein the sending the play control information comprises: sending the play control information to the at least another electronic device.

7. The method of claim 1, wherein after the sending the play control information, the method further comprises:
   sending stop play information in response to that the acoustic part of the electronic device is removed from a blocked status, to instruct the at least another electronic device to stop play a corresponding audio.

8. The method of claim 1, wherein the electronic device comprises a hand-held electronic device, and/or, the at least another electronic device comprises at least one wearable device.

9. The method of claim 8, wherein before the determining play control information of a first audio that is being played or to be played by an electronic device, in response to that an acoustic part of the electronic device is blocked, the method further comprises: determining that the hand-held electronic device is in a landscape mode.

10. The method of claim 1, wherein the determining that the acoustic part of the electronic device is blocked comprises:
    determining temperature sensing detecting information of an area where the acoustic part of the electronic device is located; and
    determining that the acoustic part of the electronic device is blocked at least according to the temperature sensing detecting information.

11. The method of claim 1, wherein the determining that the acoustic part of the electronic device is blocked comprises:
    analyzing an image of the electronic device; and
    determining that the acoustic part of the electronic device is blocked at least according to an analysis result of the image.

12. An audio play control apparatus, comprising:
    a play control information determining module, configured to determine play control information of a first audio that is being played or to be played by an electronic device, in response to determining that an acoustic part of the electronic device is blocked at least according to one or more of:
    temperature information of an area of the acoustic part of the electronic device,
    image information of the electronic device,
    acoustic impedance of the acoustic part of the electronic device, and
    amplitude loss information of a sound signal that is transmitted; and
    a play control information sending module, configured to send the play control information to play, according to the play control information, a corresponding audio through an acoustic part of at least another electronic device,
    wherein the play control information sending module comprises:
    a first play control information sending sub-module, configured to send the play control information by broadcasting.

13. The apparatus of claim 12, wherein the play control information comprises at least one of the following: attribute information of the first audio, content of the first audio, and content acquiring manner information of the first audio.

14. The apparatus of claim 12, wherein the play control information comprises: play parameter information of the first audio.

15. The apparatus of claim 14, wherein the play parameter information comprises at least one of the following: play progress information and play volume information.

16. The apparatus of claim 12, wherein the play control information comprises: amplitude and phase information of a desired sound signal of the first audio, and amplitude and phase information of the first audio that is being played or to be played by an unblocked acoustic part of the electronic device.

17. The apparatus of claim 12, wherein the play control information sending module comprises:
    a second play control information sending sub-module, configured to send the play control information to the at least another electronic device.

18. The apparatus of claim 12, further comprising:
    a stop play information determining module, configured to send stop play information in response to that the acoustic part of the electronic device is removed from a blocked status, to instruct the at least another electronic device to stop play a corresponding audio.

19. The apparatus of claim 12, wherein the electronic device comprises a hand-held electronic device, and/or, the at least another electronic device comprises at least one wearable device.

20. The apparatus of claim 19, further comprising:
a landscape mode determining module, configured to determine that the hand-held electronic device is in a landscape mode, and enable the play control information determining module according to a determining result.

21. The apparatus of claim 12, further comprising:
a block determining module, configured to determine that the acoustic part of the electronic device is blocked.

22. The apparatus of claim 21, wherein the block determining module comprises:
a temperature information acquiring sub-module, configured to determine temperature sensing detecting information of an area where the acoustic part of the electronic device is located;
a first block determining sub-module, configured to determine, at least according to the temperature sensing detecting information, that the acoustic part of the electronic device is blocked.

23. The apparatus of claim 21, wherein the block determining module comprises:
an image analysis sub-module, configured to analyze an image of the electronic device; and
a second block determining sub-module, configured to determine that the acoustic part of the electronic device is blocked at least according to an analysis result of the image.

24. An electronic device, comprising the audio play control apparatus of claim 12.

25. A non-transitory computer readable storage apparatus, comprising at least one executable instruction, which, in response to execution by a processor of a computer system, causes the computer system to perform an audio play control method, comprising:
determining play control information of a first audio that is being played or to be played by an electronic device, in response to determining that an acoustic part of the electronic device is blocked at least according to one or more of:
temperature information of an area of the acoustic part of the electronic device,
image information of the electronic device,
acoustic impedance of the acoustic part of the electronic device, and
amplitude loss information of a sound signal that is transmitted; and
sending the play control information to play, according to the play control information, a corresponding audio through an acoustic part of at least another electronic device,
wherein the sending the play control information comprises: sending the play control information by broadcasting.

26. An audio play control apparatus, comprising a processor and a memory, the memory storing computer executable instructions, the processor being connected to the memory through a communication bus, and when the apparatus for controlling task migration operates, the processor executing the computer executable instructions stored in the memory, causing the apparatus for controlling task migration to execute operations, comprising:
determining play control information of a first audio that is being played or to be played by an electronic device, in response to determining that an acoustic part of the electronic device is blocked at least according to one or more of:
temperature information of an area of the acoustic part of the electronic device,
image information of the electronic device,
acoustic impedance of the acoustic part of the electronic device, and
amplitude loss information of a sound signal that is transmitted; and
sending the play control information to play, according to the play control information, a corresponding audio through an acoustic part of at least another electronic device,
wherein the sending the play control information comprises: sending the play control information by broadcasting.

* * * * *